United States Patent
Aronowitz (10) Patent No.: US 10,056,076 B2
(45) Date of Patent: Aug. 21, 2018

(54) COVARIANCE MATRIX ESTIMATION WITH STRUCTURAL-BASED PRIORS FOR SPEECH PROCESSING

(71) Applicant: International Business Machines Corporation, Armonk, NY (US)

(72) Inventor: Hagai Aronowitz, Petah-Tikva (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/846,775

(22) Filed: Sep. 6, 2015

(65) Prior Publication Data

US 2017/0069313 A1 Mar. 9, 2017

(51) Int. Cl.
| | |
|---|---|
| G10L 15/00 | (2013.01) |
| G10L 15/07 | (2013.01) |
| G10L 15/14 | (2006.01) |
| G10L 25/24 | (2013.01) |
| G10L 15/20 | (2006.01) |

(Continued)

(52) U.S. Cl.
CPC ............. *G10L 15/14* (2013.01); *G10L 15/20* (2013.01); *G10L 17/02* (2013.01); *G10L 19/02* (2013.01); *G10L 25/24* (2013.01)

(58) Field of Classification Search
CPC ..... G10L 15/14; G10L 15/142; G10L 15/144; G10L 15/146; G10L 15/148; G10L 15/18; G10L 15/183; G10L 15/20; G10L 15/22; G10L 15/24; G10L 19/02; G10L 19/0204; G10L 19/0208; G10L 25/24; G10L 25/00; G10L 15/063; G10L 15/02; G10L 15/16

USPC ..... 704/1–10, 270, 203–204, 240, 232, 254, 704/233, 244, 246, 226
See application file for complete search history.

(56) References Cited

U.S. PATENT DOCUMENTS

| | | | |
|---|---|---|---|
| 6,697,778 B1 * | 2/2004 | Kuhn ...................... | G10L 17/02 704/256 |
| 8,750,603 B2 * | 6/2014 | Bethge ................. | H04N 19/176 375/240.02 |

(Continued)

OTHER PUBLICATIONS

"Gaussian Mixture Model with Precision Matrices Approximated by Sparsely Represented Eigenvectors", Niksa M. Jakovljevic, 22nd Telecommunications Forum TELEFOR 2014, Nov. 25, 2014.*

*Primary Examiner* — Vincent Rudolph
*Assistant Examiner* — Stephen Brinich (57) ABSTRACT

According to some embodiments of the present invention there is provided a computerized method for speech processing using a Gaussian Mixture Model. The method comprises the action of receiving by hardware processor(s) two or more covariance values representing relationships between distributions of speech coefficient values that represent two or more audible input speech signals recorded by a microphone. The method comprises the action of computing two or more eigenvectors and eignevalues using a principle component analysis of the covariance values and transforming the speech coefficient values using the eigenvectors and computing two or more second covariance values from the transformed speech coefficient values. The method comprises the action of modifying some of the second covariance values according to the eignevalues, the covariance values, and two or more indices of the speech coefficient values. The second covariance values to the speech processor comprising the Gaussian Mixture Model.

20 Claims, 2 Drawing Sheets

(51) Int. Cl.
*G10L 19/02* (2013.01)
*G10L 17/02* (2013.01)

(56) References Cited

U.S. PATENT DOCUMENTS

| | | | |
|---|---|---|---|
| 2006/0178887 A1* | 8/2006 | Webber | G10L 15/144 |
| | | | 704/256 |
| 2008/0010065 A1* | 1/2008 | Bratt | G06K 9/6222 |
| | | | 704/246 |
| 2008/0249774 A1* | 10/2008 | Kim | G10L 17/02 |
| | | | 704/250 |
| 2011/0004110 A1* | 1/2011 | Shusterman | G06F 19/3443 |
| | | | 600/509 |
| 2011/0029469 A1* | 2/2011 | Yamada | G06F 17/18 |
| | | | 706/14 |

\* cited by examiner

COVARIANCE MATRIX ESTIMATION WITH STRUCTURAL-BASED PRIORS FOR SPEECH PROCESSING

FIELD AND BACKGROUND OF THE INVENTION

The present invention, in some embodiments thereof, relates to speech processing and, more specifically, but not exclusively, to Gaussian mixture models in speech processing.

Gaussian Mixture Models (GMM) use supervectors to represent speech signals in speech processing, such as in performing speaker recognition, language identification, emotion recognition, speaker diarization, and the like. Each supervector is a vector of parameter values, changes in parameter values (first differentials), second differentials of parameter values, the interactions between the parameter values, and the like. For example, a parameter is a Mel-frequency cepstral coefficient (MFCC) used in speech signal processing. As used herein, the term feature refers to an element of a GMM supervector. In a GMM method, a Universal Background Model (UBM) with diagonal covariance matrices may be applied to the training data to extract the supervectors. For example, a UBM with 512 Gaussian mixtures is used on the MFCC speech features of training data and supervectors are extracted. As used herein, the term Gaussian refers to the Gaussian mixtures used in the UBM. GMM supervector methods are also used for other uses, such as image processing, pattern recognition, computer vision, data mining, and the like, and the embodiments of the invention described herein are relevant to these other applications and others that use GMM methods.

In a GMM Nuisance Attribute Projection (NAP) framework a GMM is adapted to data from multiple sessions, such as an enrollment session, a testing session, a development session, a training session, and/or the like, from a UBM using an iterative Expectation-Maximization (EM) method, a Maximum A Posteriori (MAP) estimation, and/or the like. A projection function is estimated from the training data and is used to compensate intra-speaker intersession variability, such as channel variability and the like.

GMM supervectors are constructed from a concatenation of GMM means and the like, with typical dimensions of up to 10,000-100,000 elements. GMM supervectors methods, such as i-vector extractor training, Joint factor analysis (JFA), NAP, and the like, require the estimation of covariance matrices to analyze the data. In order to estimate these covariance matrices, training data may be used to calculate the interdependence of the variability of the different supervector parameters. For example, training a speaker recognition system uses up to hundreds or thousands of speech samples from different speakers because of the large size of the supervectors. Sometimes there may be differences between the training data and the evaluated data. For example, when the target data is mismatched to the available training data due to channel mismatch, such as in text-dependent speaker recognition, target data may be collected and is used to train the speaker recognition system from scratch, to adapt an already existing speaker recognition system, and the like.

SUMMARY OF THE INVENTION

According to some embodiments of the present invention there is provided a computerized method for speech processing using a Gaussian Mixture Model. The method comprises the action of receiving by one or more hardware processors two or more covariance values representing relationships between distributions of two or more speech coefficient values from a speech processor comprising a Gaussian Mixture Model. The speech coefficient values represent two or more audible input speech signals recorded by one or more microphone. The method comprises the action of computing, using the one or more hardware processor, two or more eigenvectors and eignevalues using a principle component analysis of the covariance values. The method comprises the action of transforming, using the one or more hardware processor, the speech coefficient values using the eigenvectors and computing two or more second covariance values from the transformed speech coefficient values. The method comprises the action of modifying, using the one or more hardware processor, some of the second covariance values according to the eignevalues, the covariance values, and two or more indices of the speech coefficient values. The method comprises the action of sending the second covariance values to the speech processor comprising the Gaussian Mixture Model.

Optionally, the indices comprise one or more first feature index of two or more feature indices, one or more second feature index of the feature indices, one or more first Gaussian index of two or more Gaussian indices, and one or more second Gaussian index of two or more Gaussian indices.

Optionally, the modifying comprises setting some of the second covariance values equal to zero when the first feature index is not equal to the second feature index.

Optionally, the modifying comprises setting some of the second covariance values equal to zero when the one or more first feature index is not equal to the one or more second feature index and the one or more first Gaussian index is not equal to the one or more second Gaussian index.

Optionally, the modifying comprises setting some of the second covariance values equal to a value computed from the covariance values when the one or more first feature index is not equal to the one or more second feature index and the one or more first Gaussian index is equal to the one or more second Gaussian index.

Optionally, the value is computed using the formula, where denotes the covariance values, F denotes the number of low level feature dimensions and $0<=f1,f2<F$.

Optionally, the modifying comprises setting some of the second covariance values equal to a value computed from the covariance values and the eignevalues when the one or more first feature index is equal to the one or more second feature index and the one or more first Gaussian index is not equal to the one or more second Gaussian index.

Optionally, the value is computed using the formula, where here denotes the covariance values, F denotes the number of low level feature dimensions and denotes the eigenvalues of the covariance values.

Optionally, some of the speech coefficient values are two or more mel-frequency cepstral coefficient values.

Optionally, some of the speech coefficient values are two or more differences of two or more mel-frequency cepstral coefficient values.

Optionally, some of the speech coefficient values are two or more second differences of two or more mel-frequency cepstral coefficient values.

Optionally, some of the speech coefficient values are two or more supervector values derived from a universal background model of the Gaussian Mixture Model.

Optionally, some of the speech coefficient values are two or more Nuisance Attribute Projection supervector values derived from a universal background model of the Gaussian Mixture Model.

Optionally, the method further comprises an action of computing two or more second eigenvectors and second eignevalues using a second principle component analysis of the second covariance values, and applying the second eigenvectors to transform the speech coefficient values used for a speech processor scoring.

Optionally, the second covariance values are used for computing one or more speaker recognition score by the speech processor.

Optionally, the one or more speaker recognition score is normalized.

Optionally, the one or more speaker recognition score is computed by a dot product function between a training supervector of values and a testing supervector of values.

According to some embodiments of the present invention there is provided a computer program product for speech processing using a Gaussian Mixture Model, the computer program product comprising a computer readable storage medium having program instructions embodied therewith. The program instructions executable by a hardware processor cause the hardware processor to receive two or more covariance values representing relationships between distributions of two or more speech coefficient values from a speech processor comprising a Gaussian Mixture Model, where the speech coefficient values represent two or more audible input speech signals recorded by one or more microphone. The program instructions executable by a hardware processor cause the hardware processor to compute two or more eigenvectors and eignevalues using a principle component analysis of the covariance values. The program instructions executable by a hardware processor cause the hardware processor to transform the speech coefficient values using the eigenvectors and computing two or more second covariance values from the transformed speech coefficient values. The program instructions executable by a hardware processor cause the hardware processor to modify some of the second covariance values according to the eignevalues, the covariance values, and two or more indices of the speech coefficient values. The program instructions executable by a hardware processor causes the hardware processor to send the second covariance values to the speech processor comprising the Gaussian Mixture Model.

According to some embodiments of the present invention there is provided a computerized system method for speech processing using a Gaussian Mixture Model. The computerized system comprises a program store storing code. The computerized system comprises a data interface for receiving and sending data. The computerized system comprises a hardware processor coupled to the data interface and the program store for executing the stored code. The stored code comprises code to receive two or more covariance values representing relationships between distributions of two or more speech coefficient values from a speech processor comprising a Gaussian Mixture Model, where the speech coefficient values represent two or more audible input speech signals recorded by one or more microphone. The stored code comprises code to compute two or more eigenvectors and eignevalues using a principle component analysis of the covariance values. The stored code comprises code to transform the speech coefficient values using the eigenvectors and computing two or more second covariance values from the transformed speech coefficient values. The stored code comprises code to modify some of the second covariance values according to the eignevalues, the covariance values, and two or more indices of the speech coefficient values. The stored code comprises code to send the second covariance values to the speech processor comprising the Gaussian Mixture Model.

Optionally, the speech processor is incorporated in the system.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

When the available training data for modeling speaker recognition is limited, current methods used for Gaussian Mixture Models (GMM) do not calculate and/or estimate the covariance matrix sufficiently for accurate testing of evaluation data. For example, data from a few tens of speakers or even less are not sufficient training data to perform speaker recognition using GMM supervectors.

For example, perform speaker recognition and compensate for speech signal variabilities, such as channel variability, intra-speaker variability, intersession variability, and the like, when only a small training dataset is available is not possible using a high-dimensional GMM supervector based method.

By using knowledge on the way GMM supervectors are created, such as a concatenation of statistics obtained for a set of Gaussian distributions of features, to guide modeling in high dimensional supervector space, missing covariance matrix elements may be estimated with improved accuracy and GMM methods performed with limited training data.

According to embodiments of the present invention, there are available systems and methods to estimate a GMM covariance matrix from a small amount of training data. The computational relationships between features and Gaussians in a GMM-Universal Background Model (UBM) method are used to estimate missing elements of a covariance matrix from limited training data. For example, the covariance matrix is a relaxed block diagonal matrix where elements of the covariance matrix are set to zero when they correspond to different feature coefficients. For example, the covariance between two supervector components that correspond to different feature coefficients, but belong to the same Gaussian distribution, is dependent on the Gaussian index only and the corresponding covariance matrix elements are set to the same precalculated value. For example, the covariance between two supervector components that correspond to the same feature coefficient is dependent on the Gaussian indices only, and equal to $w_{g_1,f,g_2,f} = \lambda_f \beta_{g_1,g_2}$ where $\lambda_f$ are the eigenvalues computed from a principle component analysis (PCA) corresponding to the supervector feature f.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It is noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

Figure 1:
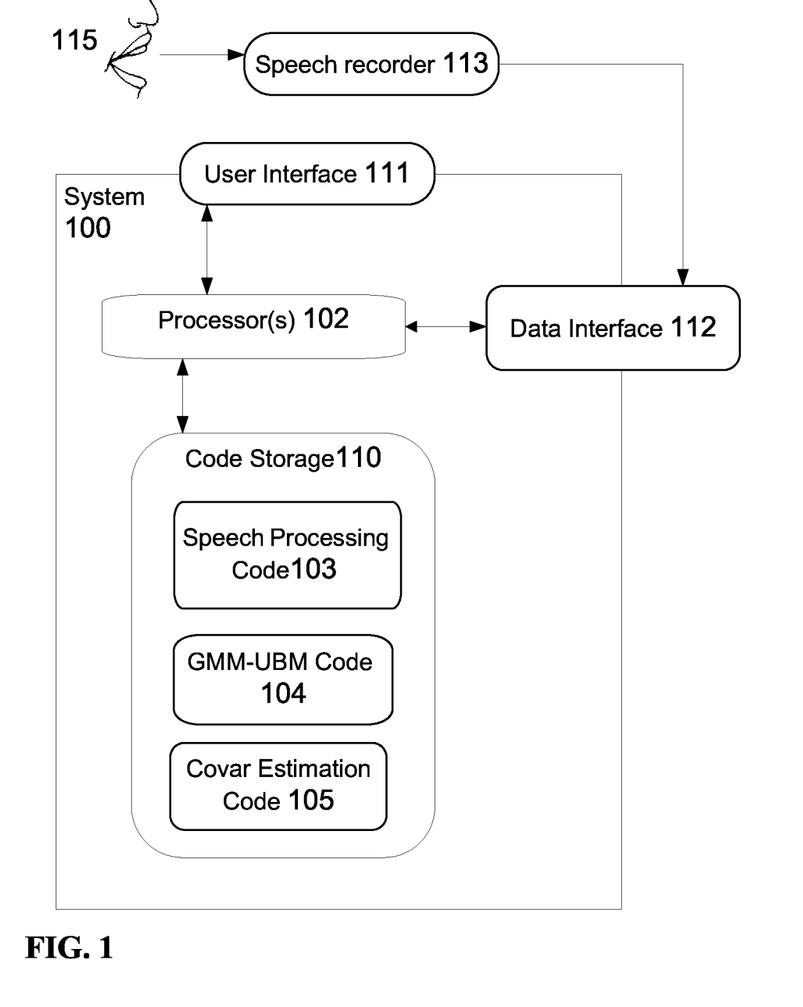
FIG. 1 is a schematic illustration of a system for estimating a covariance matrix in Gaussian Mixture Models, according to some embodiments of the invention.

Reference is now made to FIG. 1, which is a schematic illustration of a system for estimating a covariance matrix in Gaussian Mixture Models, according to some embodiments of the invention. The system 100 comprises one or more hardware processors 102 coupled to a data interface 112, a code storage 110 for storing code, and an optional user interface 111. The code storage 110 stores code for speech processing 103, such as code instructing the processor(s) 102 to compute Mel-frequency cepstral coefficients (MFCC) from a speech signal. The speech signal may be received through the data interface 112 from a speech recorder 113, such as a microphone, that records the speech sound from a speaker 115.

The code storage 110 stores code for GMM-UBM 104, such as code instructing the processor(s) 102 to receive MFCC features and computing Gaussians and supervectors. The code storage 110 stores code for covariance matrix missing value estimation 105, such as code instructing the processor(s) 102 to receive the GMM-UBM method output and estimate based on the GMM-UBM Gaussian data structure the missing elements of the supervector covariance matrix.

Figure 2:
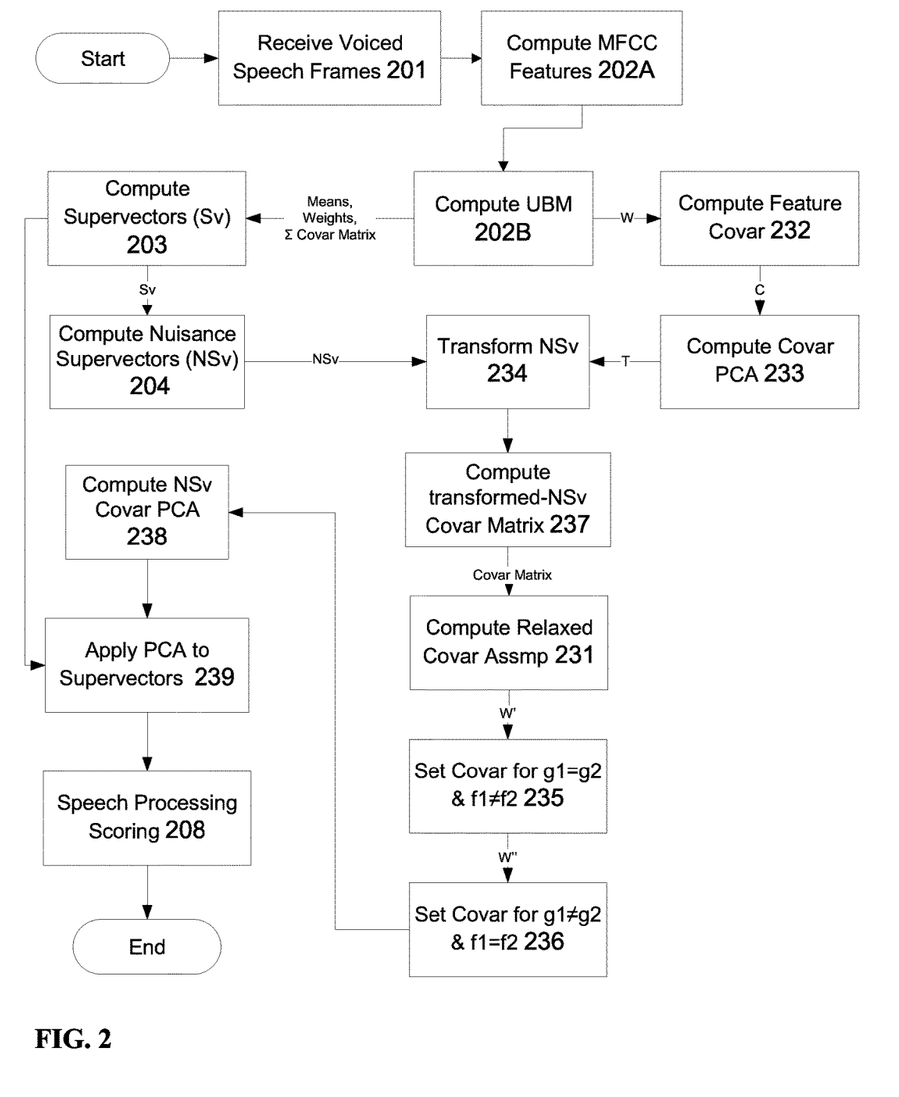
FIG. 2 is a flowchart of a method for estimating a covariance matrix in Gaussian Mixture Models, according to some embodiments of the invention.

Reference is now made to FIG. 2, which is a flowchart of a method for estimating a covariance matrix in Gaussian Mixture Models, according to some embodiments of the invention. Voiced speech frames are received 201 that represent recorder speech of a speaker 115, such as recorded by a microphone 113. For each voiced speech frame, the MFCC are computed 202A. For example, an energy based voice activity detector is used to locate and remove non-speech frames from the continuous speech signal. For example, the MFCC feature data consists of 12 cepstral coefficients augmented by 12 delta and 12 double delta coefficients extracted every 10 milliseconds using a 25 millisecond window. Data warping may be applied with a 300 frame window before computing the delta and double delta features.

The MFCC data is processed by a GMM-UBM method to compute 202B means, weights and a MFCC feature covariance matrix, such as a sample covariance matrix. For example, a 512-Gaussian Universal Background Model (UBM) with diagonal covariance matrices is computed 202B from the training data and is used for computing 203 the supervectors.

For example, the supervector covariance matrix is denoted by W for which $w_{i,j} = (w_{g_1,f_1,g_2,f_2})$ where $g_1$, $g_2$, $f_1$, and $f_2$ denote the Gaussian and feature coefficient indices, respectively, corresponding to coordinates i and j in the supervector covariance matrix.

Supervectors are computed 203 from the GMM-UBM results. For example, the means of the GMMs are stacked into a supervector after normalization with the corresponding standard deviations of the UBM and multiplied by the square root of the corresponding weight from the UBM according to the equation:

$$s = \sum\nolimits^{-1/2} (\lambda_{UBM}^{1/2} \otimes I_F)\mu$$

where $\mu$ denotes the concatenated GMM means, $\lambda_{UBM}$ denotes the vectorized UBM weights, $\Sigma$ denotes a block diagonal matrix with the covariance matrices from the UBM on its diagonal, F denotes the feature vector dimension, such as the number of features, $\otimes$ denotes the Kronecker product, and $I_F$ denotes the identity matrix of rank F.

A nuisance attribute projection (NAP) method is used to compute 204 nuisance supervectors. For example, a low-rank projection denoted P is computed by subtracting from each supervector in the training data set the corresponding supervector mean, resulting in nuisance supervectors.

The MFCC feature covariance matrix is computed 232, and principle component analysis (PCA) is applied to compute 233 eigenvalues and eigenvectors of the feature space. These eigenvalues and eigenvectors are used to transform 234 the nuisance supervectors. For example, the computed 233 PCA is used to decorrelate the feature sub-vectors. For example, the covariance matrix denoted C averages the covariance matrices of the feature vectors calculated for each Gaussian separately by computing 232 the equation:

$$C_{f_1,f_2} = \frac{1}{G}\sum_g w_{g,f_1,g,f_2}.$$

We then stack the eigenvectors of C as columns in a F×F matrix denoted T, such that T applied to the feature vector space diagonalizes C. Each nuisance supervector s is transformed by applying T on each feature sub-vector: $s = (S_1 \ldots S_G) \rightarrow (TS_1 \ldots TS_g)$.

The covariance matrix of the transformed nuisance supervectors is computed 237 prior to estimating the missing covariance matrix values. Estimating the missing covariance values applies significant smoothing to the covariance matrix and reduces the number of parameters for estimating the within-speaker covariance matrix from $O(G^2F^2)$ to $O(G^2)$. We denote this method as Gaussian-based Smoothing (GBS). Following are embodiments for implementing the GBS method.

Optionally, a block diagonal covariance matrix assumption is used to compute missing covariance matrix elements. For example, two supervector components are uncorrelated when they correspond to different feature coefficients:

$$f_1 \neq f_2 \rightarrow w_{g_1, f_1, f_2} = 0$$

as in a block diagonal within-speaker covariance matrix. The rest of the matrix may by estimated from the sample covariance matrix. In this example, the number of parameters for estimating the within-speaker covariance matrix is reduced from $O(G^2F^2)$ to $O(G^2F)$ where G denotes the number of Gaussians. We denote this method by BD.

Optionally, a relaxed block diagonal covariance matrix assumption is used to compute 231 missing covariance matrix elements. For example, two supervector components are assumed to be uncorrelated when they correspond to different feature coefficients and the corresponding Gaussian indices are different. For example, nonzero values of covariance matrix elements are allowed between two components of the same Gaussian. The rest of the covariance matrix may be estimated from the sample covariance matrix. The number of parameters for estimating the within-speaker covariance matrix is $O(G^2F)$, where it is assumed G>F. We denote this method by R-BD, and use the equation:

$$g_1 \neq g_2 \wedge f_1 \neq f_2 \rightarrow w_{g_1, g_2, f_1, f_2} = 0$$

Optionally, missing covariance matrix elements associated with the same Gaussians and different features are set 235. For example, smoothing is applied on the sample covariance matrix to set the missing elements. The covariance values between two supervector components that correspond to different feature coefficients but belong to the same Gaussian is dependent on the Gaussian index only:

$$f_1 \neq f_2 \rightarrow w_{g, f_1, g, f_2} = \alpha_g$$

where $\alpha_g$ denotes a value derived from the Gaussian distributions estimated by averaging all the values $\hat{w}_{g, f_1, g, f_2}$ for which $f_1 \neq f_2$ in the sample covariance matrix, such as by using a maximum likelihood estimation, and the like.

Optionally, missing covariance matrix elements associated with the same features but different Gaussians are set 236. For example, the covariance between two supervector components that correspond to the same feature coefficient is dependent on the Gaussian indices only:

$$w_{g_1, f, g_2, f} = \lambda_f \beta_{g_1, g_2}$$

where $\lambda_f$ denotes the eigenvalue corresponding to the f-th column in T, and $\beta_{g_1, g_2}$ denotes a value derived from the Gaussian distributions estimated by averaging all the values $$\frac{\hat{w}_{g_1, f, g_2, f}}{\lambda_f}$$

in the sample covariance matrix, such as by using a maximum likelihood estimation, and the like.

Principle component analysis is used to compute 238 eigenvalues and eigenvectors from the resulting estimated covariance matrix, and applied 239 to the supervectors. For example, PCA is used to compute 238 basis functions of the nuisance supervector and projection P is created by stacking the top k eigenvectors as columns in matrix V: $P = I - VV^t$. For example, the training supervectors are compensated by applying 239 projection P.

These supervectors are then used for speech processing 208, such as speaker recognition scoring. There may not be need to project the evaluation supervectors because dot-product scoring 208 is used. Scores may be used to decide whether to accept or reject that the evaluated speech signal belongs to a certain speaker. For example, a high score means a high probability that the speech belongs to the speaker, such as accept the speaker recognition, and a low score means a low probability that the speech belongs to the speaker, such as reject the speaker recognition. The score may also be used only to calculate the probability of speech segment to be a certain speaker. This probability may be used by another system to integrate info from other sources, such as a face identification system. A score may also be used to cluster a speech segments, speech signals, and the like, according to speaker identity. For example, scoring is performed using a dot-product between the compensated training and evaluation supervectors: $(Px)^t(Py) = x^t P^t P y = (Px)^t y$.

Optionally, normalization of the scores using the sessions from training set is performed as described by Aronowitz et al in "Modeling intra-speaker variability for speaker recognition", published in INTERSPEECH-2005, pages 2177-2180, incorporated herein by reference in its entirety.

Following are example applications describing the benefits and results of using a DBS embodiment in several cases.

The first (WF) dataset consists of 750 speakers which are partitioned into a training set of 200 speakers and an evaluation dataset of 550 speakers. Each speaker has 2 sessions using a landline phone and 2 sessions using a cellular phone. The data collection was accomplished over a period of 4 weeks. Four authentication conditions were defined and collected, such as global, speaker-dependent, prompted passphrases, and free text. This example is limited to the global condition, such as a passphrase shared among all speakers, and the same passphrase is used for training, enrollment, verification, evaluation, and the like. Following are results for the 10-digit passphrase 0-1-2-3-4-5-6-7-8-9 which is denoted ZN. In the WF dataset each session contains 3 repetitions of ZN. For each training session we use all 3 repetitions for training, and for each evaluation session we use only a single repetition.

The NIST 2010 SRE dataset was used for evaluation of embodiments of the present invention, such as the NIST 2010 SRE male core trial list with telephone conditions 5, 6, and 8. The NIST 2010 SRE dataset consists of 355, 178 and 119 target trials and 13746, 12825 and 10997 impostor trials respectively. The training dataset consists of male sessions from NIST 2004 and 2006 SREs, such as telephone data only. In total, 4374 sessions from 521 speakers are used for evaluation.

The reduced training data subsets of the WF dataset for a TD task are defined in the following table:

| Dataset Name | Number of speakers | Sessions per speaker |
|---|---|---|
| Full | 200 | LLCC |
| 50 | 50 | LLCC |
| 50LC | 50 | LC |
| 30 | 30 | LLCC |
| 30LC | 30 | LC |
| 30LL | 30 | LL |

-continued

| Dataset Name | Number of speakers | Sessions per speaker |
|---|---|---|
| 30CC | 30 | CC |
| 20 | 20 | LLCC |
| 20LC | 20 | LC |
| 30RR | 30 | 2 (random) |

In this table L stands for a landline session and C for a cellular session. For example, LLCC stands for 4 sessions comprising 2 landline and 2 cellular, and LC stands for 2 sessions comprising 1 landline and 1 cellular. Except for the data set in the last row, named 30RR, subsets are gender balanced. The last row describes a data subset for which the genders are highly imbalanced and the two sessions per speaker are selected randomly. The purpose of the 30 RR subset is to simulate a realistic condition when the actual data collected is not balanced.

In the training data subset for the TI task, the number of speakers is varied between 20 and 500. Three different subsets are created for every chosen number of speakers. The first subset consists of 2 sessions per speaker. The second subset consists of 4 sessions per speaker. The third subset consists of all the sessions available per speaker, with an average of 9 sessions per speaker.

The following table shows results for the TD task using different subsets for training:

| Method Data | 20LC | 20 | 30CC | 30LL | 30RR | 30LC | 30 | 50LC | 50 | Full |
|---|---|---|---|---|---|---|---|---|---|---|
| NAP-0 | 3.1 | 3.0 | 3.2 | 3.4 | 3.6 | 2.9 | 2.8 | 2.4 | 2.4 | 2.1 |
| NAP-10 | 2.8 | 2.5 | 3.2 | 3.3 | 3.5 | 2.4 | 2.1 | 1.8 | 1.6 | 1.0 |
| NAP-50 | 3.0 | 2.6 | 3.3 | 3.4 | 3.6 | 2.5 | 2.2 | 1.9 | 1.6 | 1.0 |
| BD | 2.7 | 2.4 | 3.0 | 3.2 | 3.2 | 2.4 | 2.2 | 1.8 | 1.7 | 1.3 |
| R-BD | 2.7 | 2.4 | 3.0 | 3.2 | 3.1 | 2.3 | 2.1 | 1.7 | 1.6 | 1.2 |
| GBS | 2.5 | 2.3 | 2.7 | 2.7 | 2.7 | 2.2 | 2.1 | 1.8 | 1.8 | 1.6 |
| NAP-full | 1.8 | 1.8 | 1.7 | 1.6 | 1.7 | 1.6 | 1.6 | 1.3 | 1.3 | 1.0 |
| Recovery Rate for GBS (%) | 30 | 29 | 33 | 35 | 44 | 25 | 0 | 0 | — | — |

In the table, the current NAP method, such as with subspace dimensions of 0, 10 and 50, is compared to the proposed methods by listing Equal Error Rate (EER) values for each method and each data set. A subspace dimension, such as the number of Gaussians in the UBM, of 250 is used for BD and R-BD, and of 1000 for GBS. The table shows EER results for training NAP with the full training dataset, but using a subset for score normalization, in order to assess embodiments of the present invention. In order to reduce the variance of the measured EER values, each experiment was repeated 10 times with randomly selected subsets. For the smaller subsets, such as 20 LC, 20, 30 CC, 30 LL, 30 RR and 30 LC, the GBS method embodiment outperforms all other methods. For larger subsets, such as 30 and 50 LC, all methods perform quite similarly with a small advantage to the R-BD method. The last row in the table shows the percentage of the error due to training the NAP projection on limited data compared to the GBS method.

The following tables show EER results for the TI task using different subsets of the training dataset and as a function of the number of speakers in the subset. Results are averaged over 10 randomly selected subsets and best result for each subset is in bold.

| Method | Cond. | 20 | 30 | 40 | 50 | 100 | 200 | 300 | 400 | 500 |
|---|---|---|---|---|---|---|---|---|---|---|
| NAP-100 | 5 | 13.7 | 13.2 | 11.8 | 10.7 | 9.6 | 7.3 | 6.2 | 5.4 | 5.4 |
| BD | | 13.7 | 13.5 | 11.0 | 9.3 | 8.1 | 6.5 | 6.5 | 6.2 | 6.2 |
| R-BD | | 13.8 | 12.9 | 10.7 | 9.1 | 8.1 | 6.5 | 6.2 | 5.6 | 5.6 |
| GBS | | 12.7 | 11.8 | 9.3 | 8.5 | 8.6 | 8.5 | 8.7 | 8.5 | 8.5 |
| NAP-100 | 6 | 16.3 | 14.7 | 14.7 | 14.5 | 14.0 | 9.6 | 8.4 | 7.9 | 7.3 |
| BD | | 14.7 | 13.5 | 13.0 | 12.4 | 11.2 | 9.0 | 7.3 | 7.3 | 6.7 |
| R-BD | | 14.6 | 12.9 | 13.0 | 12.3 | 11.2 | 8.4 | 7.3 | 6.8 | 6.8 |
| GBS | | 11.2 | 10.7 | 11.3 | 11.2 | 11.3 | 10.7 | 10.8 | 10.1 | 9.6 |
| NAP-100 | 8 | 6.7 | 5.9 | 5.0 | 5.0 | 4.2 | 2.5 | 1.7 | 1.5 | 1.7 |
| BD | | 5.9 | 5.1 | 5.0 | 3.6 | 3.4 | 3.4 | 3.4 | 3.4 | 3.2 |
| R-BD | | 5.9 | 5.0 | 5.0 | 3.4 | 2.7 | 2.3 | 1.8 | 1.8 | 1.8 |
| GBS | | 5.2 | 4.0 | 3.5 | 3.4 | 3.5 | 3.5 | 3.4 | 3.4 | 3.4 |
| NAP-100 | 5 | 12.4 | 12.1 | 10.5 | 9.0 | 7.0 | 4.8 | 4.4 | 3.9 | 3.9 |
| BD | | 12.1 | 10.4 | 8.7 | 7.9 | 6.8 | 5.6 | 5.4 | 5.1 | 5.1 |
| R-BD | | 12.1 | 10.1 | 9.0 | 7.3 | 6.4 | 5.3 | 5.1 | 5.1 | 5.1 |
| GBS | | 12.4 | 10.4 | 9.6 | 9.3 | 9.3 | 9.2 | 9.2 | 9.2 | 9.2 |
| NAP-100 | 6 | 14.6 | 12.5 | 12.1 | 11.7 | 10.1 | 6.2 | 5.6 | 5.1 | 5.0 |
| BD | | 12.9 | 10.7 | 10.7 | 10.2 | 9.0 | 6.7 | 6.7 | 5.6 | 5.6 |
| R-BD | | 12.4 | 10.7 | 10.7 | 10.0 | 8.4 | 6.7 | 6.2 | 6.2 | 5.6 |
| GBS | | 10.8 | 10.6 | 10.6 | 10.7 | 10.6 | 10.7 | 10.6 | 10.6 | 10.2 |
| NAP-100 | 8 | 5.1 | 4.3 | 3.5 | 3.4 | 2.3 | 1.0 | 1.0 | 0.8 | 0.8 |
| BD | | 5.1 | 4.4 | 3.4 | 2.7 | 2.5 | 2.5 | 2.5 | 2.4 | 2.3 |
| R-BD | | 5.0 | 4.4 | 3.4 | 2.5 | 2.5 | 1.7 | 1.8 | 1.7 | 2.3 |
| GBS | | 5.2 | 4.2 | 4.2 | 4.2 | 4.1 | 4.5 | 4.2 | 4.2 | 4.2 |

The first table shows results for two sessions per speaker, and the second table shows results for four sessions per speaker. The baseline NAP method, with a subspace dimension of 100, is contrasted to the proposed methods. A subspace dimension of 1000 for BD and R-BD, and 4000 for GBS is used. In order to reduce the variance of our measured EERs, each experiment is repeated 10 times with randomly selected subsets. For the smaller subsets, such as with 20-50 speakers with 2 sessions per speaker, the GBS embodiment outperforms all other methods. For larger subsets, such as 100-300 speakers with 2 sessions per speaker and 50-100 speakers with 4 sessions per speaker, an R-BD embodiment is the best method. For even larger subsets, the baseline system is best. Experiments on data subsets with all sessions per speaker showed the baseline system as having the best performance.

The results for the TD and TI task differ in that the subspace dimensions we found optimal for TI are roughly 4 times higher than for TD. For the TI task, the GBS method embodiment reduces error by 20% on average for subsets of 20-50 speakers with two sessions per speaker, and reduces error by 10% on average for subsets of 20-30 speakers with four sessions per speaker. The relaxed block diagonal method embodiment gives an average 15% error reduction for the range of 20-200 speakers with 2 sessions, and an average 10% error reduction for the range of 20-100 speakers with 4 sessions.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It is noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations may be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant Gaussian Mixture Models will be developed and the scope of the term Gaussian Mixture Model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations are apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for clustering at least one of speech segments and speech signals of a speaker using a Gaussian Mixture Model, comprising:
   receiving a plurality of audible input speech signals originated from said speaker and recorded by at least one microphone;
   using at least one hardware processor to execute a code for clustering the at least one of speech segments and speech signals of said said speaker with a reduced error rate:
      computing a plurality of eigenvectors and eigenvalues using a principle component analysis of a plurality of covariance values representing relationships between distributions of a plurality of speech coefficient values of said plurality of audible input speech signals,
      transforming said plurality of speech coefficient values using said plurality of eigenvectors and computing a plurality of second covariance values from said transformed plurality of speech coefficient values,
      modifying some of said plurality of second covariance values according to said plurality of eigenvalues, said plurality of covariance values, and a plurality of indices of said plurality of speech coefficient values; and
   estimating an identity of said speaker by processing said plurality of second covariance values using a Gaussian Mixture Model;
   using said identity to cluster the at least one of speech segments and speech signals of said speaker with the reduced error rate.

2. The method of claim 1, wherein said plurality of indices comprise at least one first feature index of a plurality of feature indices, at least one second feature index of said plurality of feature indices, at least one first Gaussian index of a plurality of Gaussian indices, and at least one second Gaussian index of a plurality of Gaussian indices.

3. The method of claim 2, wherein said modifying comprises setting some of said plurality of second covariance values equal to zero when said first feature index is not equal to said second feature index.

4. The method of claim 2, wherein said modifying comprises setting some of said plurality of second covariance values equal to zero when said at least one first feature index is not equal to said at least one second feature index and said at least one first Gaussian index is not equal to said at least one second Gaussian index.

5. The method of claim 2, wherein said modifying comprises setting some of said plurality of second covariance values equal to a value computed from said plurality of covariance values when said at least one first feature index is not equal to said at least one second feature index and said at least one first Gaussian index is equal to said at least one second Gaussian index.

6. The method of claim 5, wherein said value is computed using the formula $$\frac{1}{F(F-1)} \sum_{f_1 \neq f_2} \hat{w}_{g,f_1,g,f_2},$$

where $\hat{w}_{g,f_1,g,f_2}$ denotes the said plurality of covariance values, F denotes the number of low level feature dimensions and $0 <= f_1, f_2 < F$.

7. The method of claim 2, wherein said modifying comprises setting some of said plurality of second covariance values equal to a value computed from said plurality of covariance values and said plurality of eignvalues when said at least one first feature index is equal to said at least one second feature index and said at least one first Gaussian index is not equal to said at least one second Gaussian index.

8. The method of claim 7, wherein said value is computed using the formula $$\frac{1}{F} \sum_f \frac{w_{g_1,f,g_2,f}}{\lambda_f},$$

where here $w_{g_1,f,g_2,f}$ denotes said plurality of covariance values, F denotes the number of low level feature dimensions and $\lambda_f$ denotes the eigenvalues of said plurality of covariance values.

9. The method of claim 1, wherein some of said plurality of speech coefficient values are a plurality of mel-frequency cepstral coefficient values.

10. The method of claim 1, wherein some of said plurality of speech coefficient values are a plurality of differences of a plurality of mel-frequency cepstral coefficient values.

11. The method of claim 1, wherein some of said plurality of speech coefficient values are a plurality of second differences of a plurality of mel-frequency cepstral coefficient values.

12. The method of claim 1, wherein some of said plurality of speech coefficient values are a plurality of supervector values derived from a universal background model of said Gaussian Mixture Model.

13. The method of claim 1, wherein some of said plurality of speech coefficient values are a plurality of Nuisance Attribute Projection supervector values derived from a universal background model of said Gaussian Mixture Model.

14. The method of claim 1, further comprising an action of computing a plurality of second eigenvectors and second eignvalues using a second principle component analysis of said plurality of second covariance values, and applying said plurality of second eigenvectors to transform said plurality of speech coefficient values used for a speech processor scoring.

15. The method of claim 1, wherein said plurality of second covariance values are used for computing at least one speaker recognition score by said speech processor.

16. The method of claim 15, wherein said at least one speaker recognition score is normalized.

17. The method of claim 15, wherein said at least one speaker recognition score is computed by a dot product function between a training supervector of values and a testing supervector of values.

18. A computer program product for clustering at least one of speech segments and speech signals of a speaker using a Gaussian Mixture Model, the computer program product comprising a non transitory computer readable storage medium having program instructions embodied therewith, the program instructions executable by a hardware processor to cause said hardware processor to:

cluster the at least one of speech segments and speech signals of said speaker with a reduced error rate:

receiving a plurality of audible input speech signals originated from a speaker and recorded by at least one microphone;

computing a plurality of eigenvectors and eignevalues using a principle component analysis of a plurality of covariance values representing relationships between distributions of a plurality of speech coefficient values of said plurality of audible input speech signals;

transforming said plurality of speech coefficient values using said plurality of eigenvectors and computing a plurality of second covariance values from said transformed plurality of speech coefficient values;

modifying some of said plurality of second covariance values according to said plurality of eignevalues, said plurality of covariance values, and a plurality of indices of said plurality of speech coefficient values;

estimating said identity of said speaker by processing said plurality of second covariance values using said Gaussian Mixture Model; and         using said identity to cluster the at least one of speech segments and speech signals with the reduced error rate.

19. A computerized system method for clustering at least one of speech segments and speech signals of a speaker using a Gaussian Mixture Model, comprising:

a program store storing a code, a data interface for receiving and sending data, and a hardware processor coupled to said data interface and said program store for executing the stored code for clustering the at least one of speech segments and speech signals of said speaker with a reduced error rate, the stored code comprising:

code to receive a plurality of audible input speech signals originated from said speaker and recorded by at least one microphone;

code to compute a plurality of eigenvectors and eignevalues using a principle component analysis of a plurality of covariance values representing relationships between distributions of a plurality of speech coefficient values of said plurality of audible input speech signals;

code to transform said plurality of speech coefficient values using said plurality of eigenvectors and computing a plurality of second covariance values from said transformed plurality of speech coefficient values;

code to modify some of said plurality of second covariance values according to said plurality of eignevalues, said plurality of covariance values, and a plurality of indices of said plurality of speech coefficient values;

code to estimate said identity of said speaker by processing said plurality of second covariance values using said Gaussian Mixture Model;

code to use said identity to cluster the at least one of speech segments and speech signals with the reduced error rate.

20. The computerized system of claim 19, wherein said hardware processor is incorporated in said system.

* * * * *